(12) United States Patent
Katchmart et al.

(10) Patent No.: US 10,068,589 B1
(45) Date of Patent: Sep. 4, 2018

(54) SELF-SERVO-WRITE SYSTEMS FOR DETECTING INTERFERENCE CAUSED BY PRE-WRITTEN SEED WEDGES

(71) Applicant: Marvell International LTD., Hamilton (BM)

(72) Inventors: Supaket Katchmart, San Jose, CA (US); Xinyang Yang, Santa Clara, CA (US); Li Zhang, Milpitas, CA (US); David Sue-Hong Liaw, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 15/704,724

(22) Filed: Sep. 14, 2017

Related U.S. Application Data

(60) Provisional application No. 62/395,593, filed on Sep. 16, 2016.

(51) Int. Cl.
| | |
|---|---|
| *G11B 5/596* | (2006.01) |
| *G11B 5/012* | (2006.01) |
| *G11B 20/12* | (2006.01) |

(52) U.S. Cl.
CPC .......... *G11B 5/012* (2013.01); *G11B 20/1217* (2013.01); *G11B 5/59633* (2013.01); *G11B 5/59638* (2013.01); *G11B 5/59655* (2013.01); *G11B 5/59661* (2013.01); *G11B 5/59666* (2013.01); *G11B 5/59688* (2013.01); *G11B 2020/1281* (2013.01)

(58) Field of Classification Search
None
See application file for complete search history.

(56) References Cited

U.S. PATENT DOCUMENTS

| | | | |
|---|---|---|---|
| 7,209,312 B1* | 4/2007 | Sutardja ............. | G11B 5/59666 360/77.07 |
| 7,751,144 B1* | 7/2010 | Sutardja ............. | G11B 5/59688 360/77.07 |
| 7,936,530 B1* | 5/2011 | Ton-That ........... | G11B 5/59633 360/55 |
| 8,023,216 B1* | 9/2011 | Cheung .............. | G11B 5/59633 360/51 |
| 8,027,114 B1* | 9/2011 | Han ......................... | G11B 5/09 360/39 |
| 8,068,304 B1* | 11/2011 | Cheung .............. | G11B 5/59633 360/51 |
| 2007/0211367 A1* | 9/2007 | Lau ..................... | G11B 5/59638 360/75 |

* cited by examiner

*Primary Examiner* — Tan X Dinh

(57) ABSTRACT

A system includes a controller and a detector. The controller is configured to read servo spirals written on a magnetic surface of a disk drive. The servo spirals are written on the magnetic surface of the disk drive based on seed wedges. The seed wedges are written on the magnetic surface of the disk drive prior to writing the servo spirals on the magnetic surface of the disk drive. The controller is configured to write a servo pattern on the magnetic surface of the disk drive based on reading the servo spirals written on the magnetic surface of the disk drive. The detector is configured to detect, while reading the servo spiral written on the magnetic surface of the disk drive, interference caused by the seed wedges written on the magnetic surface of the disk drive.

20 Claims, 9 Drawing Sheets

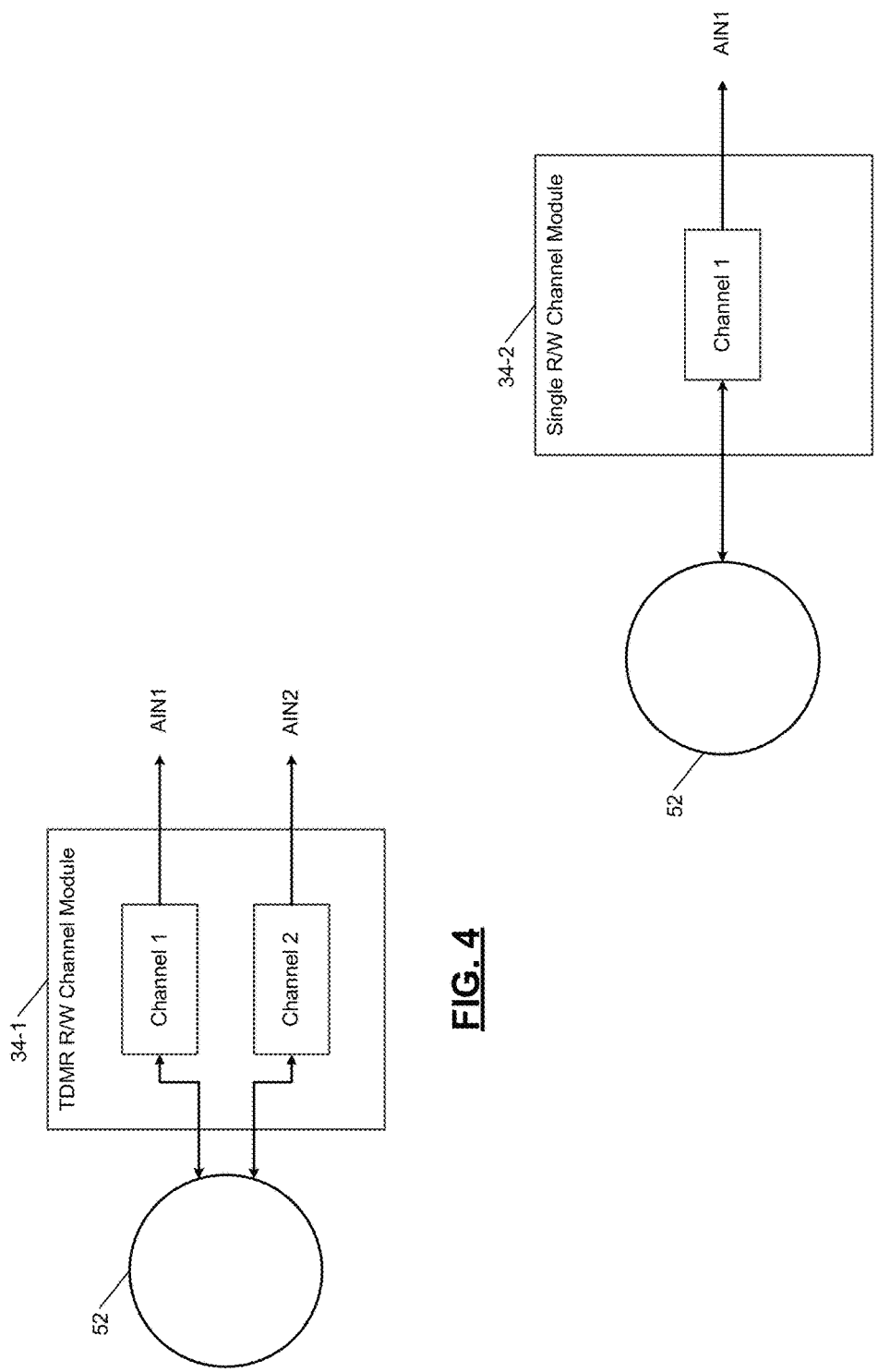

SELF-SERVO-WRITE SYSTEMS FOR DETECTING INTERFERENCE CAUSED BY PRE-WRITTEN SEED WEDGES

CROSS-REFERENCE TO RELATED APPLICATIONS

This application claims the benefit of U.S. Provisional Application No. 62/395,593, filed on Sep. 16, 2016. The entire disclosure of the application referenced above is incorporated herein by reference.

FIELD

The present disclosure relates generally to hard disk drives and more particularly to interference detection in spiral-based self-servo-write (SSW) systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Hard disk drives (HDDs) include magnetic recording surfaces called platters and read/write heads that read and write data on the platters. Before data can be written on the platters, a servo pattern is recorded on the platters. The read/write heads use the servo pattern for positioning when reading and writing data on the platters.

Modern HDDs use a self-servo-write (SSW) system to write the servo pattern. The SSW system uses the read/write heads of the HDDs to write the servo pattern. The SSW system writes the servo pattern as follows. First, the SSW system writes seed wedges on a blank disk. Then the SSW system uses the seed wedges for positioning and writes servo spirals. Specifically, the SSW system tracks angular and radial position of the disk by sensing the seed wedges and writes the servo spirals. The SSW system writes the seed wedges and the servo spirals using signals of different frequencies.

Thereafter, the SSW system writes the servo pattern based on the servo spirals. Specifically, the SSW system uses the servo spirals for tracking disk position and writes the servo pattern. For example, the SSW system tracks disk position using the servo spirals and uses a zone servo SSW system to write the servo pattern including concentric servo wedges. Subsequently, user data can be written on the platters using the servo pattern as a reference for positioning the read/write heads.

SUMMARY

A system comprises a controller and a detector. The controller is configured to read servo spirals written on a magnetic surface of a disk drive. The servo spirals are written on the magnetic surface of the disk drive based on seed wedges. The seed wedges are written on the magnetic surface of the disk drive prior to writing the servo spirals on the magnetic surface of the disk drive. The controller is configured to write a servo pattern on the magnetic surface of the disk drive based on reading the servo spirals written on the magnetic surface of the disk drive. The detector is configured to detect, while reading the servo spiral written on the magnetic surface of the disk drive, interference caused by the seed wedges written on the magnetic surface of the disk drive.

In other features, the detector detects the interference by detecting power of signals generated by reading the seed wedges while reading the servo spirals.

In other features, the detector detects the interference when the power of signals generated by reading the seed wedges is greater than or equal to a predetermined threshold. the controller writes the servo pattern based on reading the servo spirals when the power of signals generated by reading the seed wedges is less than the predetermined threshold.

In other features, the seed wedges and the servo spirals are respectively written using signals of first and second frequencies. The controller includes a first filter to detect a first signal of the first frequency from a first input and a second filter to detect a second signal of the second frequency from a second input. The detector detects power of the first signal of the first frequency and detects the interference based on the power of the first signal of the first frequency. The controller determines based on the interference whether to write the servo pattern based on the second signal of the second frequency.

In other features, the first and second filters include band pass filters with center frequencies set to the first and second frequencies, respectively.

In other features, the controller further comprises a first amplifier to amplify the first input to the first filter and a second amplifier to amplify the second input to the second filter. The controller adjusts a gain of the first amplifier based on a gain of the second amplifier. The detector detects the power of the signal of the first frequency based on the adjusted gain of the first amplifier.

In other features, the controller writes the servo pattern using a timing circuit set to a third frequency, where the third frequency is not an integer multiple of the first frequency. The detector detects the power of the signal of the first frequency by performing a Discrete Fourier Transform on the signal of the first frequency using the timing circuit set to the third frequency.

In other features, the detector detects the power of the signal of the first frequency by accumulating results generated by restarting the Discrete Fourier Transform a plurality of times within a predetermined time period.

In other features, the seed wedges, the servo spirals, and the servo pattern are respectively written using signals of first, second, and third frequencies, where the third frequency is not an integer multiple of the first frequency. The controller comprises a first circuit, including a first filter and a first timing circuit each set to the second frequency, to filter a first input using the first filter and to detect the servo spirals from the first input using the first timing circuit. The controller comprises a second circuit, including a second filter set to the first frequency and a second timing circuit set to the third frequency, to filter a second input using the second filter, detect the seed wedges from the second input using the second timing circuit, and write the servo pattern at the third frequency based on the detected servo spirals using the second timing circuit.

In other features, the detector detects power of signals of the first frequency received from the second filter by performing a Discrete Fourier Transform on the signals of the first frequency using the second timing circuit, and by accumulating results generated by restarting the Discrete Fourier Transform a plurality of times within a predetermined time period.

In other features, the seed wedges and the servo spirals are respectively written using signals of first and second frequencies, where the first frequency is less than the second frequency. The controller includes a low pass filter to filter an input including signals of the first and second frequencies. The detector detects power of a first signal of the first frequency and detects the interference based on the power of the first signal of the first frequency. The controller determines based on the interference whether to write the servo pattern based on a second signal of the second frequency.

In other features, the controller writes the servo pattern based on the second signal of the second frequency using signals of a third frequency, where the third frequency is not an integer multiple of the first frequency. The detector detects the power of the first signal of the first frequency by performing a Discrete Fourier Transform on the first signal of the first frequency, and by accumulating results generated by restarting the Discrete Fourier Transform a plurality of times within a predetermined time period.

In still other features, a method comprises reading servo spirals written on a magnetic surface of a disk drive. The servo spirals are written on the magnetic surface of the disk drive based on seed wedges. The seed wedges are written on the magnetic surface of the disk drive prior to writing the servo spirals on the magnetic surface of the disk drive. The method further comprises writing a servo pattern on the magnetic surface of the disk drive based on reading the servo spirals written on the magnetic surface of the disk drive. The method further comprises detecting, while reading the servo spiral written on the magnetic surface of the disk drive, interference caused by the seed wedges written on the magnetic surface of the disk drive.

In other features, the method further comprises detecting the interference by detecting power of signals generated by reading the seed wedges while reading the servo spirals. The method further comprises detecting the interference when the power of signals generated by reading the seed wedges is greater than or equal to a predetermined threshold. The method further comprises writing the servo pattern based on reading the servo spirals when the power of signals generated by reading the seed wedges is less than the predetermined threshold.

In other features, the seed wedges and the servo spirals are respectively written using signals of first and second frequencies. The method further comprises detecting, using a first filter, a first signal of the first frequency from a first input. The method further comprises detecting, using a second filter, a second signal of the second frequency from a second input. The method further comprises detecting power of the first signal of the first frequency and detecting the interference based on the power of the first signal of the first frequency. The method further comprises determining based on the interference whether to write the servo pattern based on the second signal of the second frequency. The first and second filters include band pass filters with center frequencies set to the first and second frequencies, respectively.

In other features, the method further comprises amplifying, using a first amplifier, the first input to the first filter; and amplifying, using a second amplifier, the second input to the second filter. The method further comprises adjusting a gain of the first amplifier based on a gain of the second amplifier and detecting the power of the signal of the first frequency based on the adjusted gain of the first amplifier.

In other features, the method further comprises writing the servo pattern using a timing circuit set to a third frequency, where the third frequency is not an integer multiple of the first frequency. The method further comprises detecting the power of the signal of the first frequency by performing a Discrete Fourier Transform on the signal of the first frequency using the timing circuit set to the third frequency. The method further comprises detecting the power of the signal of the first frequency by accumulating results generated by restarting the Discrete Fourier Transform a plurality of times within a predetermined time period.

In other features, the seed wedges, the servo spirals, and the servo pattern are respectively written using signals of first, second, and third frequencies, where the third frequency is not an integer multiple of the first frequency. The method further comprises filtering a first input using a first filter of a first circuit and detecting the servo spirals from the first input using a first timing circuit of the first circuit, where the first filter and the first timing circuit are set to the second frequency. The method further comprises filtering a second input using a second filter of a second circuit, where the second filter is set to the first frequency and detecting the seed wedges from the second input using a second timing circuit of the second circuit, where the second timing circuit is set to the third frequency. The method further comprises writing the servo pattern at the third frequency based on the detected servo spirals using the second timing circuit. The method further comprises detecting power of signals of the first frequency received from the second filter by performing a Discrete Fourier Transform on the signals of the first frequency using the second timing circuit, and by accumulating results generated by restarting the Discrete Fourier Transform a plurality of times within a predetermined time period.

In other features, the seed wedges and the servo spirals are respectively written using signals of first and second frequencies, where the first frequency is less than the second frequency. The method further comprises filtering, using a low pass filter, an input including signals of the first and second frequencies. The method further comprises detecting power of a first signal of the first frequency and detecting the interference based on the power of the first signal of the first frequency. The method further comprises determining based on the interference whether to write the servo pattern based on a second signal of the second frequency.

In other features, the method further comprises writing the servo pattern based on the second signal of the second frequency using signals of a third frequency, where the third frequency is not an integer multiple of the first frequency. The method further comprises detecting the power of the first signal of the first frequency by performing a Discrete Fourier Transform on the first signal of the first frequency, and by accumulating results generated by restarting the Discrete Fourier Transform a plurality of times within a predetermined time period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 4 shows a schematic representation of a two-dimensional magnetic recording (TDMR) system including dual read/write channels for the HDD.

FIG. 5 shows a schematic representation of a single read/write channel for the HDD.

In the drawings, reference numbers may be reused to identify similar and/or identical elements.

DESCRIPTION

Figure 1:
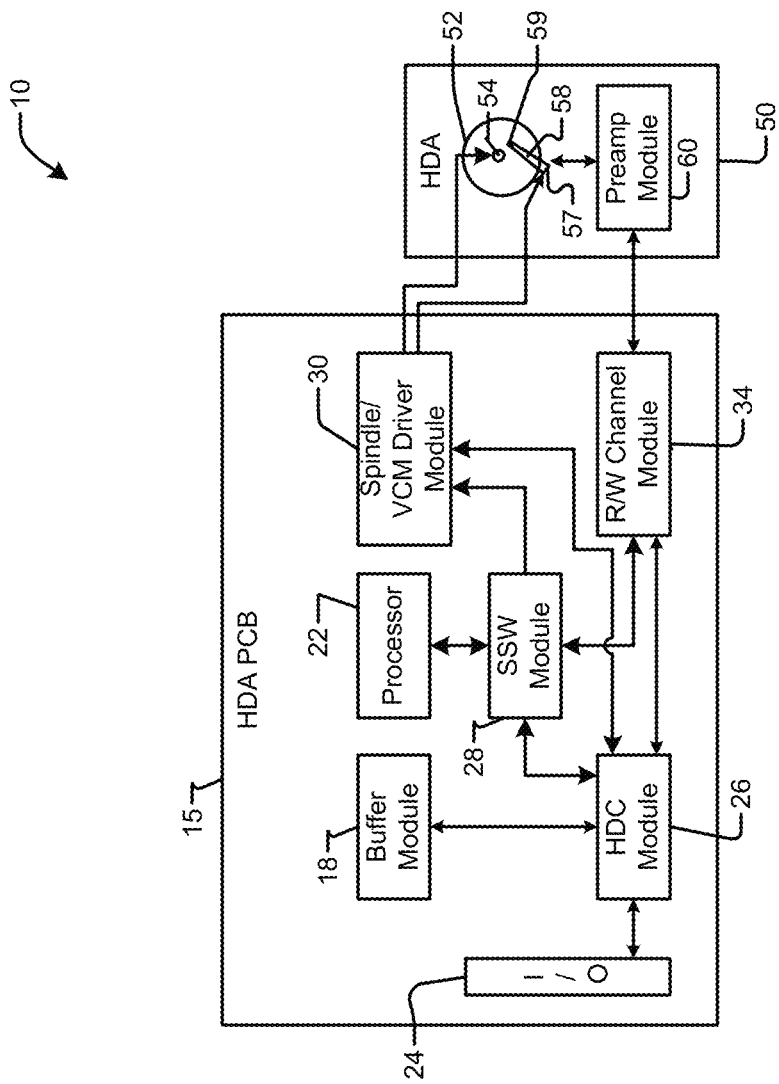
FIG. 1 is a functional block diagram of a hard disk drive (HDD) that uses a self-servo write (SSW) system to record servo information on the HDD.

When the self-servo-write (SSW) system writes the servo pattern, the SSW system tracks the disk position using the servo spirals, which are written based on the pre-written seed wedges. When the SSW system tracks the disk position using the servo spirals, the pre-written seed wedges may interfere with the reading of the servo spirals. The interference from the pre-written seed wedges may distort the spiral data (i.e., data obtained from reading the servo spirals), which can adversely affect the recording of the servo pattern.

The present disclosure relates to systems and methods for detecting the interference from the seed wedges when the SSW system writes the servo pattern by tracking the disk position using the servo spirals. The presence of seed wedges when reading the servo spirals is detected by detecting the power of signals generated by the seed wedges when reading the servo spirals. When the presence of the seed wedges is detected, the spiral data, which is affected by the presence of the seed wedges, is discarded. When the presence of the seed wedges is not detected, the spiral data, which is unaffected by the presence of the seed wedges, is used to write the servo pattern.

When the hard disk drive (HDD) is equipped with a two-dimensional magnetic recording (TDMR) system, the systems and methods of the present disclosure utilize the dual read/write channels of the TDMR system to detect the interference from the seed wedges. Specifically, one TDMR channel is used to read the servo spirals, and another TDMR channel is used to detect the presence of the seed wedges and to write the servo pattern based on the spiral data when the presence of the seed wedges is not detected.

When the HDD uses a single read/write channel system (i.e., when the HDD is not equipped with the TDMR system), the systems and methods of the present disclosure utilize the single read/write channel to read the servo spirals, detect the interference from the seed wedges, and write the servo pattern based on the spiral data when the presence of the seed wedges is not detected.

In both scenarios, as explained below in detail, the systems and methods utilize a modified Discrete Fourier Transform (DFT) system (also called DFT engine) to detect the presence of seed wedges when reading the servo spirals. The modified DFT system detects the presence of seed wedges by detecting the power of seed wedge signals. The modified DFT system detects the power of the seed wedge signals while writing the servo pattern using signals with a frequency that is not an integer multiple of a frequency of the seed wedge signals.

The present disclosure is organized as follows. First, the SSW system is described with reference to FIGS. 1 and 2. The interference from the seed wedges is described with reference to FIG. 3. The dual read/write channels of the TDMR system of a HDD and the single read/write channel of a HDD without the TDMR system are explained with reference to FIGS. 4 and 5. The detection of the interference from the seed wedges using the modified DFT system is described in detail with reference to FIGS. 6 and 7. A general method for detecting the interference from the seed wedges is described with reference to FIG. 8. A first method for detecting the interference from the seed wedges using the dual read/write channels of the TDMR system is described with reference to FIG. 9. A second method for detecting the interference from the seed wedges using the single read/write channel is described with reference to FIG. 10.

The systems and methods of the present disclosure do not always write servo wedges after detecting servo spirals. For example, the systems and methods can write multiple servo wedges based on reading one servo spiral. A servo spiral is used to maintain a lock between disk position and an internal write clock of the read channel that is used to write the servo wedges. Accordingly, an indirect relationship exists between reading or detecting the servo spirals, timing control, and writing servo wedges. If servo spiral data (i.e., data from reading a servo spiral) is disqualified (i.e., discarded due to interference from a seed wedge), it does not mean that writing servo wedges is stopped or skipped. Instead, the servo spiral data from the disqualified servo spiral is simply not used to update the lock or the timing information, and writing servo wedges is continued based on the last updated lock or timing (e.g., based on lock or timing last updated based on servo spiral data with no interference from a seed wedge).

FIG. 1 shows a HDD 10 including a hard disk assembly (HDA) 50 and a HDA printed circuit board (PCB) 15. The HDA PCB 15 comprises a buffer module 18 that stores data associated with the control of the HDD 10. The buffer module 18 may employ SDRAM or other types of low latency memory. A processor 22 is arranged on the HDA PCB 15 and performs processing that is related to the operation of the HDD 10.

A hard disk controller (HDC) module 26 communicates with the buffer module 18, the processor 22, a spindle/VCM (voice coil motor) driver module 30, and an input/output interface module 24. The input/output interface module 24 may include a serial interface module, a parallel interface module, a serial Advance Technology Attachment (ATA) interface module, a parallel ATA interface module, or any other suitable interface to interface the HDD 10 to a host (not shown).

The HDC module 26 communicates with a read/write (R/W) channel module 34. The read/write (R/W) channel module 34 is also called the read channel module 34. During write operations, the R/W channel module 34 encodes data that is to be written on the HDD 10 by a R/W device 59. The R/W device 59 may also be referred to as the R/W head 59. The R/W channel module 34 processes data for reliability using coding schemes such as error correction coding (ECC) and run length limited coding (RLL). During read operations, the R/W channel module 34 converts an analog output of the R/W head 59 into a digital signal. The digital signal is then decoded to recover the data written on the HDD 10.

The HDA 50 includes one or more circular recording surfaces called platters 52 that are used to store data. The platters 52 include a magnetic coating for storing data in terms of magnetic fields. The platters 52 are stacked on top of one another in the form of a spindle. The spindle comprising the platters 52 is rotated by a spindle motor 54. Generally, the spindle motor 54 rotates the platters 52 at a fixed speed during read/write operations. The spindle/VCM driver module 30 controls the speed of the spindle motor 54.

One or more actuator arms 58 move relative to the platters 52 during read/write operations. The spindle/VCM driver module 30 controls the positioning of the actuator arm 58 by using mechanisms such as a voice coil actuator or a stepper motor. For example, a voice coil motor (VCM) 57, which is controlled by the spindle/VCM driver module 30, may be used to control the positioning of the actuator arm 58.

The R/W head 59 is located near a distal end of the actuator arm 58. The R/W head 59 includes a write element such as an inductor (not shown) that generates a magnetic field. The R/W head 59 also includes a read element (such as a magneto-resistive (MR) element, also not shown) that senses magnetic field on the platters 52. The HDA 50 includes a preamp module 60, which amplifies analog read/write signals.

When reading data, the preamp module 60 amplifies low-level signals received from the read element and outputs the amplified signal to the R/W channel module 34. While writing data, a write current is generated that flows through the write element of the R/W head 59. The write current is switched to produce a magnetic field having a positive or negative polarity. The positive or negative polarity is stored on the platters 52 and is used to represent data.

Figure 2:
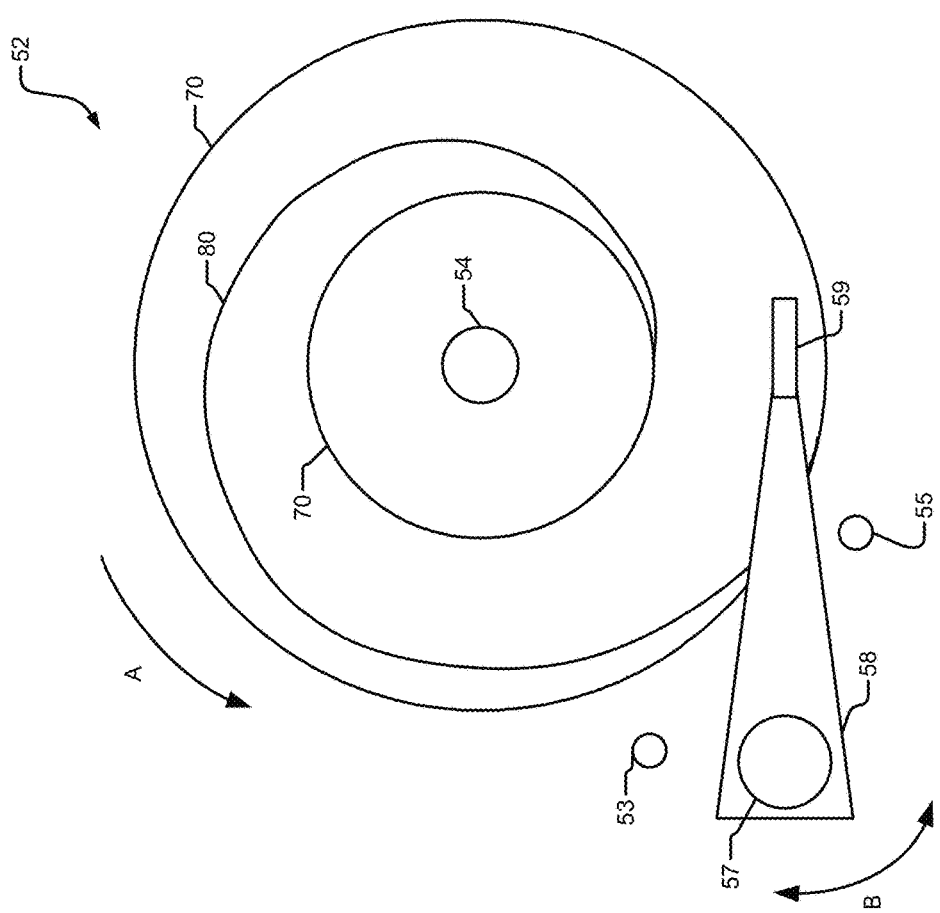
FIG. 2 is a schematic representation of writing data and servo information on magnetic medium of the HDD.

FIG. 2 shows that data is typically written on the platters 52 in concentric circles called tracks 70. The tracks 70 are divided radially into multiple sectors. A circumferential length 74 of sectors decreases as the diameter of the tracks 70 decreases towards the center of the platters 52.

Before performing a read/write operation on a sector of a track 70, the R/W head 59 locks onto the track 70 by referring to positioning information called servo information. The servo information is generally prewritten on the platters 52 and provides the positioning information that is used by the R/W head 59 to read and write data at correct locations on the platters 52.

The HDD 10 uses a SSW module 28 to write the servo information on the platters 52 using the read/write device 59. The servo information includes the servo wedges, the servo spirals, and the servo pattern. The SSW module 28 first writes the seed wedges on a blank disk. The SSW module 28 then writes servo spirals on the disk based on the pre-written seed wedges. Thereafter, the SSW module 28 writes the servo pattern based on the servo spirals. The servo pattern is used to position the R/W head 59 to read and write data at correct locations on the platters 52.

The SSW module 28 may communicate with the processor 22, the HDC module 26, the spindle/VCM driver module 30, and the R/W channel module 34. The SSW module 28 generates control signals to write the servo information on the platters 52. For example, the SSW module 28 generates control commands that control movement of the actuator arm 58 during servo writing. The HDC module 26 and the spindle/VCM driver module 30 may implement the control commands during SSW. The SSW module 28 may utilize the processor 22 to verify the servo pattern by performing read-after-write operations.

During SSW, the platters 52 may rotate in direction A, and the actuator arm 58 may move in direction B as shown in FIG. 2. Motion delimiters called crashstops may be used to prevent the actuator arm 58 from moving beyond safe limits. For example, the VCM 57 may cause the actuator arm 58 to move between crashstop 55 and crashstop 53 while the R/W head 59 writes the servo spirals 80 between tracks 70. The crashstop 55 may be referred to as an outer diameter (OD) crashstop 55. The crashstop 53 may be referred to as an inner diameter (ID) crashstop 53. The servo spirals 80 may be written from ID to OD or from OD to ID. When the servo spirals 80 are written, the actuator arm 58 is accelerated from a stationary position to a predetermined velocity by applying current to the VCM 57.

Figure 3:
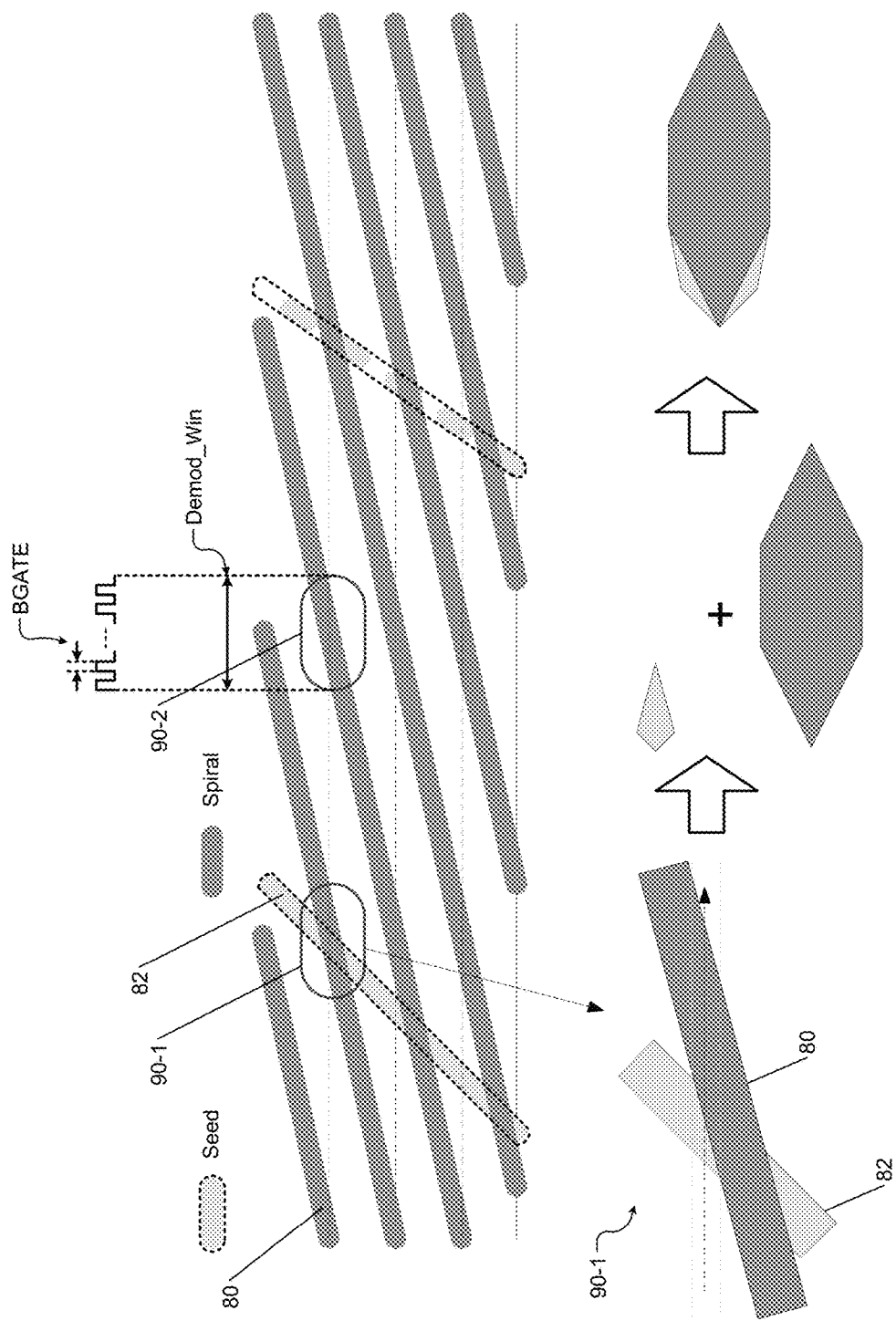
FIG. 3 shows seed wedges and servo spirals written on a magnetic medium of the HDD.

FIG. 3 shows that when tracking with the servo spirals, the SSW system can encounter areas (e.g., area 90-1) where a servo spiral 80 and a seed wedge 82 intersect. In this area 90-1, the phase and magnitude of a servo spiral signal (i.e., a signal generated when a servo spiral is read) may be affected due to interference from a seed wedge signal (i.e., a signal generated when a seed wedge is read while reading a servo spiral). The interference can affect a phase of a servo spiral time stamp, which indicates angular position of the disk; and a magnitude of the servo spiral signal, which indicates radial position of the disk.

FIG. 3 also shows an example of an area 90-2, where a servo spiral 80 and a seed wedge 82 do not intersect. In this area 90-2, the phase and magnitude of a servo spiral signal (i.e., a signal generated when a servo spiral is read) are not affected due to interference from a seed wedge signal (i.e., a signal generated when a seed wedge is read).

FIG. 3 further shows an example of a demodulation window (Demod_Win) in which a servo spiral signal is demodulated to obtain spiral data that is used to write the servo pattern. A plurality of burst gate (BGATE) signals within the demodulation window (Demod_Win) are used with the DFT system according to the present disclosure to detect the interference from the seed wedges as explained below with reference to FIGS. 6 and 7.

One way to detect the interference from the seed wedges is to de-convolute the seed wedge signal from the servo spiral signal. However, de-convoluting the seed wedge signal from the servo spiral signal may not be practical. Instead, the systems and methods of the present disclosure sense an amount of power of a seed wedge signal in a read signal while reading a servo spiral and detect the interference from the seed wedge signal to the servo spiral signal in the read signal based on the amount of power of the seed wedge signal in the read signal. Before describing the systems and methods of the present disclosure for detecting the interference, the two types of read channels that can be used by an HDD are briefly explained.

FIG. 4 shows a read channel module 34-1 of the HDD 10 (i.e., one example of the read channel module 34 of the HDD 10 shown in FIG. 1) when the HDD 10 uses a two-dimensional magnetic recording (TDMR) system to read and write data on the platters 52. When the HDD 10 uses the TDMR system, the read channel module 34-1 utilizes two channels to read and write data on the platters 52: Channel 1 and Channel 2. Each of the two channels utilizes a different R/W head 59 to read/write data on the platter 52. For example, a first channel (Channel 1) uses a first R/W head 59-1 (not shown) to read data from the platter 52 and generates a first analog input AIN1, and a second channel (Channel 2) uses a second R/W head 59-2 (not shown) to read data from the platter 52 and generates a second analog input AIN2. A time base of the second channel (Channel 2)

may also be used by a write circuit to write the servo information on the platters 52. As explained below in detail, the second channel (Channel 2) can also be utilized to detect the interference from the seed wedges while reading the servo spirals using the first channel (Channel 1) and while writing the servo pattern using the time base of the second channel (Channel 2) based on the servo spirals read using the first channel (Channel 1).

FIG. 5 shows a read channel module 34-2 of the HDD 10 (i.e., another example of the read channel module 34 of the HDD 10 shown in FIG. 1) when the HDD 10 uses a single read channel (Channel 1) to read and write data on the platters 52. When the HDD 10 uses a single read channel (Channel 1) (i.e. when the read channel module 34-2 is similar to the read channel module 34 shown in FIG. 1), the same channel may also be used to write the servo information on the platters 52. That is, the read channel module 34-2 uses the R/W head 59 to read and write data on the platters 52 as well as to write the servo information on the platters 59. The read channel module 34-2 uses the R/W head 59 to read data from the platters 52 and generates an analog input AIN1. As explained below in detail, the read channel module 34-2 can also be utilized to detect the interference from the seed wedges while reading the servo spirals and while writing the servo pattern based on the servo spirals.

The SSW module 28 receives the inputs AIN1 and AIN2 (when TDMR is used) or the input AIN1 (when TDMR is not used) from the read channel module 34. In either case, the SSW module 28 detects interference from the seed wedges while reading the servo spirals and while writing the servo pattern based on the servo spirals. The SSW module 28 outputs the servo spiral data (i.e., the data obtained from reading the servo spirals), without the interference from the seed wedges present, to the HDC module 26 (shown in FIG. 1) for further processing. The HDC module 26 provides information to the read channel module 34 to write the servo pattern on the platters 42 based on the servo spiral data received from the SSW module 28 without the interference from the seed wedges present.

Figure 6:
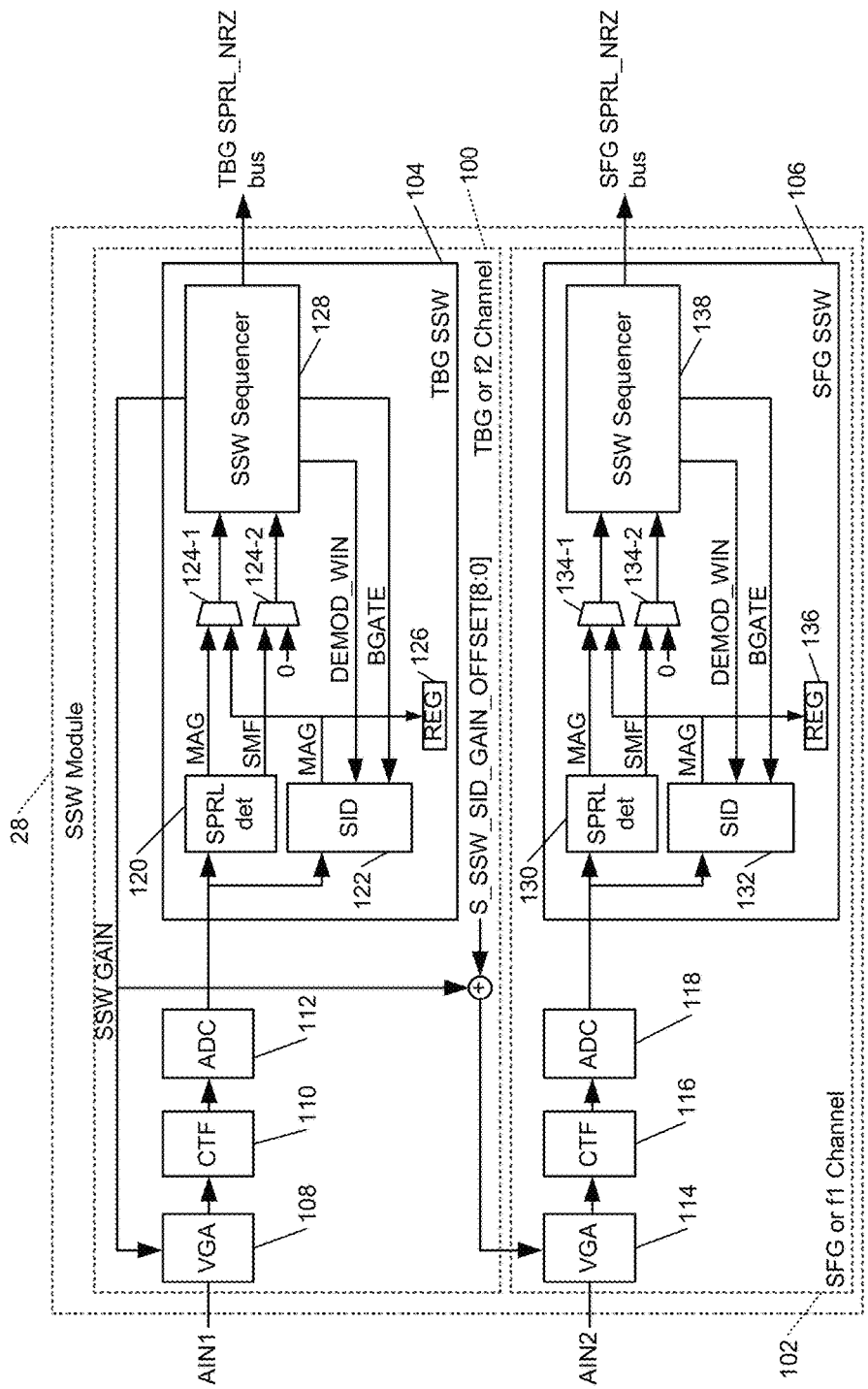
FIG. 6 shows a functional block diagram of the SSW system of the HDD.

FIG. 6 shows an example of the SSW module 28 when the HDD 10 uses the TDMR system (and therefore uses the outputs AIN1 and AIN2 of the read channel module 34-1). The SSW module 28 includes an upper half portion 100 that communicates with the first channel (Channel 1) of the read channel module 34-1. The SSW module 28 includes a lower half portion 102 that communicates with the second channel (Channel 2) of the read channel module 34-1.

When the HDD does not use the TDMR system (and therefore uses the read channel module 34-2), the SSW module 28 includes only the elements shown in the upper half portion 100 (elements labeled TBG SSW 104 and corresponding VGA 108, CTF 110, and ADC 112), which is also called a TBG channel or f2 channel, where f2 is the servo spiral frequency (all abbreviations are expanded below). When the HDD does not use the TDMR system, the SSW module 28 does not include the elements shown in the lower half portion 102 (elements labeled SFG SSW 106 and corresponding VGA 114, CTF 116, and ADC 118), which is also called an SFG channel or f1 channel, where f1 is the seed wedge frequency (again, all abbreviations are expanded below).

The upper half portion 100 of the SSW module 28 (i.e., the TBG channel or f2 channel) processes the read signals or input (AIN1) received from the first channel (Channel 1) of the TDMR system of the read channel module 34-1 or from the single channel (Channel 1) of the read channel module 34-2 when the TDMR system is not used. The upper half portion 100 of the SSW module 28 (i.e., the TBG channel or f2 channel) detects the servo spirals when the TDMR system is used. The upper half portion 100 of the SSW module 28 (i.e., the TBG channel or f2 channel) detects the servo spirals as well as seed wedges and also writes the servo patterns when the TDMR system is not used.

The lower half portion 102 of the SSW module 28 (i.e., the SFG channel or f1 channel) processes the read signals or input (AIN2) received from the second channel (Channel 2) of the TDMR system of the read channel module 34-1. The lower half portion 102 of the SSW module 28 (i.e., the SFG channel or f1 channel) detects the seed wedges when the TDMR system is used.

The SSW module 28 uses two time base circuits: a time base generator (TBG) and a servo frequency generator (SFG). The upper half portion 100 of the SSW module 28 (i.e., the TBG channel or f2 channel) includes the time base generator (TBG) or a timing circuit 104 (shown as TBG SSW). The lower half portion 102 of the SSW module 28 (i.e., the SFG channel or f1 channel) includes the servo frequency generator (SFG) or a timing circuit 106 (shown as SFG SSW).

Throughout the present disclosure, the following notation is used. A frequency of the seed wedge signals is called f1 (also called seed frequency, seed wedge frequency, or seed wedge signal frequency). A frequency of the servo spiral signals is called f2 (also called spiral frequency, servo spiral frequency, or servo spiral signal frequency). A frequency of the servo pattern signals is called f3 (also called servo writing frequency, or servo writing signal frequency).

The timing of the time base generator (TBG) or the timing circuit 104 is set to the spiral frequency f2. The upper half portion 100 of the SSW module 28 is used to detect servo spirals and is called an f2 channel 100 or a TBG channel 100. The timing of the servo frequency generator (SFG) or the timing circuit 106 is set to the servo writing frequency f3. The lower half portion 102 of the SSW module 28 is used to detect seed wedges and is called an f1 channel 102 or an SFG channel 102.

The upper half portion 100 of the SSW module 28 (i.e., the f2 channel 100 or the TBG channel 100) additionally includes a variable gain amplifier (VGA) 108, an analog filter (shown as a continuous time filter or CTF) 110, and an analog-to-digital converter (ADC) 112. The variable gain amplifier (VGA) 108 amplifies the input AIN1. The analog filter 110 filters the amplified input AIN1. The analog-to-digital converter (ADC) 112 converts the filtered input AIN1 into digital format.

The lower half portion 102 of the SSW module 28 (i.e., the f1 channel 102 or the SFG channel 102) additionally includes a variable gain amplifier (VGA) 114, an analog filter (shown as a continuous time filter or CTF) 116, and an analog-to-digital converter (ADC) 118. The variable gain amplifier (VGA) 114 amplifies the input AIN2. The analog filter 116 filters the amplified input AIN2. The analog-to-digital converter (ADC) 118 converts the filtered input AIN2 into digital format.

In the upper half portion 100 of the SSW module 28 (i.e., the f2 channel 100 or the TBG channel 100), the analog filter 110 is typically configured as a bandpass filter with a center frequency set to the frequency f2 of the servo spiral signals. Since the frequency f1 of the seed wedge signals is different than the frequency f2 of the servo spiral signals, the seed wedge signals are likely to be attenuated by the analog filter 110. This can make detection of the seed wedge signals using the f2 channel 100 difficult. Therefore, to detect the seed wedge signals, the present disclosure utilizes the second channel (Channel 2) of the TDMR system and the lower half portion 102 of the SSW module 28 (i.e., the f1 channel 102 or the SFG channel 102), where the analog filter 116 is configured as a bandpass filter with a center frequency set to the frequency f1 of the seed wedge signals.

Detecting the seed wedge signals using the lower half portion 102 of the SSW module 28 (i.e., the f1 channel 102 or the SFG channel 102) poses a challenge. This is because the timing of the servo frequency generator (SFG) or the timing circuit 106 in lower half portion 102 of the SSW module 28 (i.e., the f1 channel 102 or the SFG channel 102) is set to the servo writing frequency f3, and the servo writing frequency f3 is not an integer multiple of the frequency of the seed wedge signals f1.

Typically, a Discrete Fourier Transform (DFT) system is used to detect the seed wedges by detecting sync marks of the seed wedges. However, the typical DFT system works well when the detected frequency is 1/N times the sampling frequency, where N is an integer. The typical DFT system cannot be utilized to detect the seed wedges using the f1 channel 102 because the timing of the servo frequency generator (SFG) or the timing circuit 106 is set to the servo writing frequency f3, which is not an integer multiple of the frequency f1 of the seed wedge signals. Therefore, according to the present disclosure, the typical DFT system is modified as explained below with reference to FIG. 7. The modified DFT system is not used to detect the sync marks of the seed wedges. Instead, the modified DFT system is used to detect the power of the seed wedge signals as explained below.

The timing circuits 104 and 106 are now briefly described. The timing circuit 104 includes a spiral detector 120, a seed interference detector (SID) 122, multiplexers 124-1 and 124-2 (collectively multiplexers 124), a register (or memory) 126, and a sequencer 128. The timing circuit 106 includes a spiral detector 130, a seed interference detector (SID) 132, multiplexers 134-1 and 134-2 (collectively multiplexers 134), a register (or memory) 136, and a sequencer 138.

In the timing circuit 104, the spiral detector 120 receives the output of the ADC 112 and detects servo spirals. The spiral detector 120 outputs a magnitude (MAG) of a detected servo spiral signal. The spiral detector 120 also outputs a sync mark found (SMF) signal upon finding a sync mark of the detected servo spiral signal. When the HDD 10 does not use the TDMR system (i.e., in the absence of the SFG or f1 channel 102), the seed interference detector (SID) 122 receives the output of the ADC 112 and detects interference from seed wedges as explained below in more detail with reference to FIG. 7. The seed interference detector (SID) 122 outputs a magnitude (MAG) of the detected seed wedge. The multiplexer 124-1 outputs the magnitude (MAG) of the detected servo spiral signal or the magnitude (MAG) of the detected seed wedge. The multiplexer 124-2 selectively outputs the sync mark found (SMF) signal. The register (or memory) 126 stores the magnitude (MAG) of the detected seed wedge.

The sequencer 128 includes a finite state machine (FSM) to demodulate the spiral data from the detected servo spiral based on the outputs of the multiplexers 124. The sequencer 128 outputs the demodulation window (Demod_Win) within which a servo spiral signal is demodulated and a plurality of burst gate (BGATE) signals within the demodulation window (Demod_Win). Based on these signals, the seed interference detector (SID) 122 detects the interference from the seed wedges as explained below in detail with reference to FIG. 7.

The timing circuits 104 and 106 differ in that when the HDD 10 is equipped with the TDMR system, the timing circuit 104 is set to the spiral frequency f2 whereas the timing circuit 106 is set to the servo writing frequency f3. Further, the timing circuit 104 detects only servo spirals and does not detect seed wedges whereas the timing circuit 106 detects only seed wedges and does not detect servo spirals. The multiplexers 124 of the timing circuit 104 provide the output of the spiral detector 120 instead of the output of the seed interference detector (SID) 122 to the sequencer 128. The multiplexers 134 of the timing circuit 106 provide the output of the seed interference detector (SID) 132 instead of the output of the spiral detector 130 to the sequencer 138.

Further, when the HDD 10 is not equipped with the TDMR system (i.e., when the SSW module 28 includes only the f2 channel 100), the timing circuit 104 detects both servo spirals and seed wedges. The multiplexers 124 provide the output of the spiral detector 120 to the sequencer 128 and provide the output of the seed interference detector (SID) 122 to the register 126. Other than these differences, the components of the timing circuits 104 and 106 operate similarly. Therefore, the operations of the components of only the timing circuit 104 are described below. The components of the timing circuit 106 operate similarly except for the above differences, and therefore their operations are not repeated.

The timing circuit 104 outputs the demodulated spiral data to the HDC module 26. The timing circuit 106 outputs to the HDC module 26 the signal power of the seed wedges detected while reading the servo spirals. The HDC module 26 processes the inputs received from the timing circuits 104 and 106. The HDC module 26 discards the servo spiral data (i.e., does not use the servo spiral data to update the timing or lock information) received from the timing circuit 104 when the detected signal power of the seed wedges while reading the servo spirals exceeds a predetermined threshold (indicating interference due to presence of seed wedges detected by the timing circuit 106). The read channel module 34 does not use the servo spiral data to update the timing or lock information and writes the servo pattern on the platters 52 based on the previous timing or lock information.

When the detected signal power of the seed wedges while reading the servo spirals does not exceed the predetermined threshold (indicating no interference due to presence of seed wedges detected by the timing circuit 106), the HDC module 26 provides information to the read channel module 34. The read channel module 34 updates the timing or lock information based on the servo spiral data received from the SSW module 28 and writes the servo pattern on the platters 52 using the updated timing or lock information.

Thus, the interference detection is not used to inhibit servo writing. Rather, it is used to qualify the quality of spiral demodulation from the first channel (Channel 1) (i.e., the TBG channel) as to whether that information (i.e., the demodulated spiral data) is good enough to be used for close loop control of head position. Accordingly, that information (i.e., the demodulated spiral data) is indirectly used to write the servo pattern.

The f1 channel 102 differs from the f2 channel 100 in that a gain of the VGA 114 of the f1 channel 102 is controlled based on a gain of the VGA 108 of the f2 channel 100. Specifically, the sequencer 128 of the f2 channel 100 controls the gain of the VGA 108 based on the demodulation of the servo spirals detected by the timing circuit 104 of the f2 channel 100. The sequencer 128 of the f2 channel 100 controls the gain of the VGA 114 of the f1 channel 102 based on the gain of the VGA 108 of the f2 channel 100 and an offset. The offset is determined based on empirical data and is used to adjust the gain of the VGA 114 of the f1 channel 102 to detect the presence of the seed wedges. Additionally, to detect the seed wedges, the analog filter 116 of the f1 channel 102 is operated in a fixed mode (i.e., with center frequency set to the seed wedge frequency f1); and the analog filter 116 does not track the servo writing frequency f3 or its integer fractions.

In HDDs without the TDMR system (i.e., with the single read channel module 34-2 shown in FIG. 5), the SSW module 28 includes only the f2 channel 100. The f2 channel 100 is used to detect servo spirals, to detect interference from the seed wedges, and to write the servo pattern when the seed wedge frequency f1 is less than the spiral frequency f2. In this alternative configuration, the analog filter 110 is configured as a low pass filter instead of being configured as a bandpass filter. The seed interference detector (SID) 122 is operated in parallel with the spiral detector 120, utilizing the same demodulation window (Demod_Win) as the spiral detector 122.

The operation of the seed interference detector (SID) 122 is now described in detail with reference to FIG. 7. The seed interference detector (SID) 132 has similar structure as that shown in FIG. 7 and operates similarly as the seed interference detector (SID) 122 and is therefore not described again for brevity.

Figure 7:
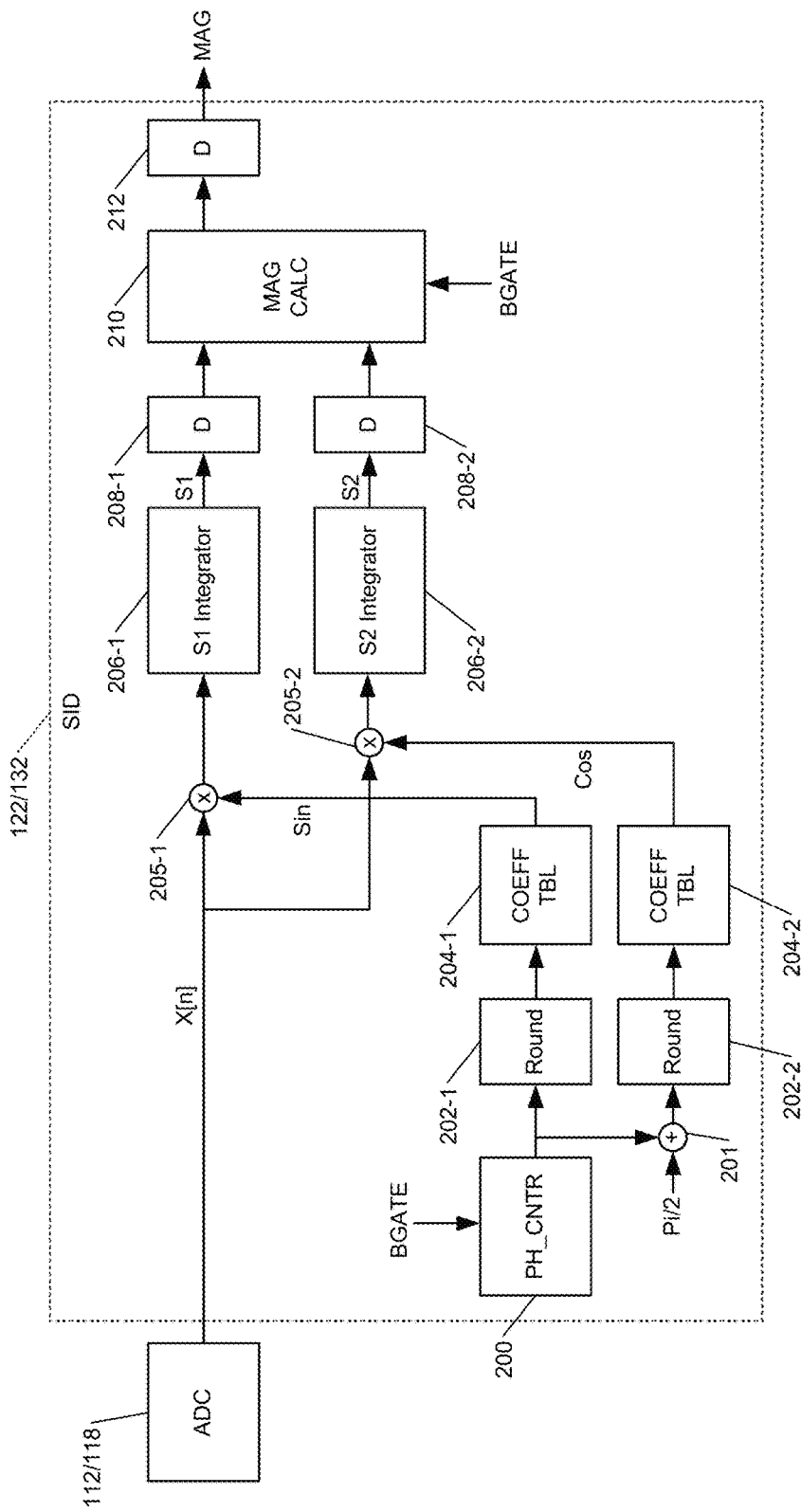
FIG. 7 shows a functional block diagram of a seed interference detector (SID) used by the SSW system of the HDD to detect interference from seed wedges while reading servo spirals and writing a servo pattern on the magnetic medium of the HDD.

FIG. 7 shows the seed interference detector (SID) 122/132 in detail. The SID 122 includes a phase counter 200, an adder 201, rounding modules 202-1 and 202-2 (collectively rounding module 202), coefficient tables 204-1 and 204-2 (collectively coefficient tables 204), multipliers 205-1 and 205-2 (collectively multipliers 205), integrators 206-1 and 206-2 (collectively integrators 206), delay circuits 208-1 and 208-2 (collectively delay circuits 208), a magnitude calculator 210, and a delay circuit 212. The delay circuits 208 and 212 synchronize the various signals of the SID 122. The operation of the remaining elements of the SID 122 is described below in detail.

Before describing the operation of the SID 122, the design of the SID 122 is explained. Ideally, using the standard Discrete Fourier Transform (DFT) procedure, the SID 122 can start integration at a rising edge of demodulation window (DEMOD_WIN or Demod_Win). During the DEMOD_WIN, at every falling edge of the burst gate (BGATE) signal, the SID 122 can generate a magnitude to send to a spiral engine. In other words, the SID 122 can behave just like a spiral detector (e.g., the spiral detector 120/130).

In actual operating conditions, however, the performance of the SID 122 is dictated by the worst case scenario, where the frequency of servo spiral sync marks (which is normally ½ of the servo writing frequency) is equal to seed wedge frequency. If the frequency of servo spiral sync marks is equal to seed wedge frequency, the phase of the servo spiral sync marks will be 180 degree out of phase relative to the seed wedge phase.

Accordingly, in the worst case scenario, the ideal Discrete Fourier Transform (DFT) procedure will produce wrong magnitude result. This is because the signal power from the servo spiral sync marks will cancel out the signal power from the seed wedge signal due to the 180 degree phase difference between the two.

Therefore, the SID 122 designed according to the present disclosure uses a modified DFT procedure as follows. The modified DFT procedure according to the present disclosure restarts at the beginning of every burst gate (BGATE) signal and accumulates signal magnitude calculated at each BGATE signal.

The modified DFT procedure is not as linear as the traditional DFT procedure because the modified DFT procedure does not complete the whole DFT cycle. Any error due to the incomplete DFT cycle is insignificant, however, and is within an acceptable error tolerance.

Since the modified DFT procedure used by the SID 122 calculates and accumulates signal magnitude at every BGATE signal, the problem of signal power from the servo spiral sync mark canceling out the seed wedge signal power is resolved. The modified DFT procedure is represented by a modified DFT equation as follows and is also called the DFT engine. The symbols and terms used in the modified DFT equation are explained below.

$$mag = \sum_{k=0}^{K} \sqrt{\left(\sum_{m=k\times M}^{k\times M+M-1} X[m] \times \sin(\text{ANG\_STEP}*m)\right)^2 + \left(\sum_{m=k\times M}^{k\times M+M-1} X[m] \times \cos(\text{ANG\_STEP}*m)\right)^2}$$

Using the modified DFT procedure, the SID 122 starts integration at a rising edge of every BGATE signal within a demodulation window (DEMOD_WIN or Demod_Win). At a falling edge of every BGATE signal, the SID 122 generates a signal magnitude and sends it to the spiral engine. These signal magnitudes are accumulated and used to detect presence of seed wedges while reading servo spirals. This makes the SID 122 behave just like a spiral detector.

When the HDD 10 uses the TDMR system, in the f1 channel 102, the sequencer 138 uses the accumulated magnitude provided by the SID 132 instead of the magnitude provided by the spiral detector 130 (the selection being made by the multiplexers 134). When the HDD 10 does not use the TDMR system, in the f2 channel 100, the sequencer 128 uses the accumulated magnitude provided by the SID 122 instead of the magnitude provided by the spiral detector 120 (the selection being made by the multiplexers 124).

The accumulated magnitude indicates the signal power of the seed wedge signal. If the accumulated magnitude is greater than or equal to a predetermined threshold, the presence of seed wedges (i.e., interference from the seed wedges) is detected while reading the servo spirals, and the servo spiral data is not used to write the servo pattern. That is, if the presence of seed wedges (i.e., interference from the seed wedges) is detected while reading the servo spirals, the read channel module 34 does not use the servo spiral data to update the timing or lock information and writes the servo pattern on the platters 52 based on the previous timing or lock information.

If the accumulated magnitude is less than the predetermined threshold, the seed wedges are (i.e., interference from the seed wedges is) not present, and the servo spiral data is used to write the servo pattern. That is, if the seed wedges are (i.e., interference from the seed wedges is) not present while reading the servo spirals, the read channel module 34 updates the timing or lock information based on the servo spiral data received from the SSW module 28 and writes the servo pattern on the platters 52 using the updated timing or lock information.

Again, the interference detection is not used to inhibit servo writing. Rather, it is used to qualify the quality of spiral demodulation from the first channel (Channel 1) (i.e., the TBG channel) as to whether that information (i.e., the demodulated spiral data) is good enough to be used for close loop control of head position. Accordingly, that information (i.e., the demodulated spiral data) is indirectly used to write the servo pattern.

The operation of the SID 122/132 is now described in detail. The phase counter 200 is a fractional modulo unsigned integer counter. The phase counter 200 counts the phase of DFT coefficients. The DFT coefficients are the sine and cosine terms in the modified DFT equation above. The cosine term is generated by adding PI/2 (i.e., by adding a phase angle of 90 degrees using the adder 201) to the sine term.

The phase counter 200 starts counting the phase of the DFT coefficients from 0 at a rising edge of each BGATE signal within a demodulation window (DEMOD_WIN). The phase counter 200 is incremented in steps of S_SSW_(SFG/TBG)_SID_PH_STEP. The phase increment does not need to satisfy an equation PH_INC*N=2PI, where N is integer number. Thus, the first angle of the next revolution does not always start at 0 degree (thus the angle of a different revolution will not repeat itself). The phase counter 200 provides a running phase angle for the DFT engine.

An example of selecting the step of S_SSW_(SFG/TBG)_SID_PH_SETP follows. The step of S_SSW_(SFG/TBG)_SID_PH_STEP can be selected based on the SFG frequency (i.e., the servo writing frequency f3) and the seed wedge signal frequency f1. For example, suppose that the SFG frequency is f3=400 MHz and that the seed wedge frequency is f1=85 MHz. Accordingly, Tseed=1000/85 ns (period of seed wedge signal)
Tsfg=1000/400 ns (period of SFG or servo writing signal)
Tsfg=0.2125 Tseed.
LSB of S_SSW_SID_PH_STEP=$2^{-16}$ Tseed
Tsfg=0.2125/($2^{-16}$)=13926.4
Select S_SSW_SID_PH_STEP=13926

In the above example, the phase counter 200, which is a modulo 2^16 counter would count 0, 13926, 27852, 41778, 55704, 4094, and 18020. These numbers correspond to 2^16/N*2PI radians for the DFT coefficients. These numbers are quantized (rounded) (e.g., to 8 bit numbers) by the rounding modules 202-1 and 202-2. The rounding module 202-1 processes the sine DFT coefficient. The rounding module 202-2 processes the cosine DFT coefficient. The rounded or quantized values output by the rounding modules 202-1 and 202-2 are respectively fed to lookup tables 204-1 and 204-2 to generate the DFT coefficients (i.e., the sine and cosine terms of the modified DFT equation).

The multipliers 205-1 and 205-2 multiply the sine and cosine DFT coefficients by ADC sample X[n]. The integrators 206-1 and 206-2 integrate the products output by the multipliers 205-1 and 205-2 and output the S1 and S2 terms of the modified DFT equation as follows.

$S1=\Sigma X[n]*\sin(ANG\_STEP*n)$ $S2=\Sigma X[n]*\cos(ANG\_STEP*n)$

The magnitude calculator 210 runs the DFT engine represented by the modified DFT equation from the rising edge of a BGATE signal until de-assertion of the BGATE signal. The magnitude calculator 210 calculates the signal magnitude by accumulating the S1 and S2 terms calculated at the falling edge of every BGATE signal within a demodulation window (DEMOD_WIN).

The accumulated signal magnitude within a demodulation window (DEMOD_WIN) provided by the magnitude calculator 210 can be compared to a predetermined threshold to detect interference due to presence of seed wedges when reading servo spirals. Based on the interference detection, the servo spiral data can be discarded (if interference is detected) or used (if no interference is detected) to write the servo pattern.

Figure 8:
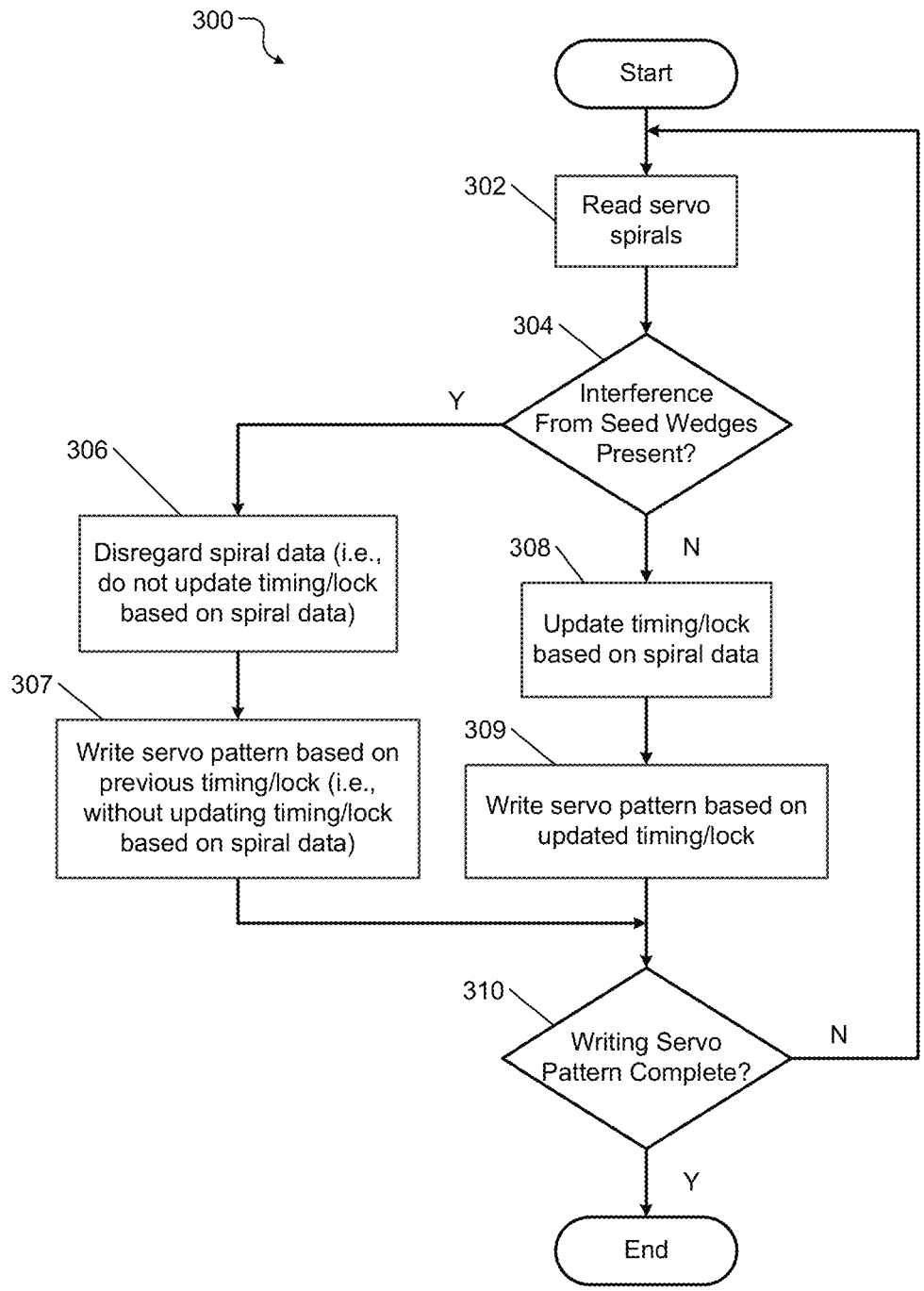
FIG. 8 shows a method for detecting the interference from the seed wedges.
Figure 9:
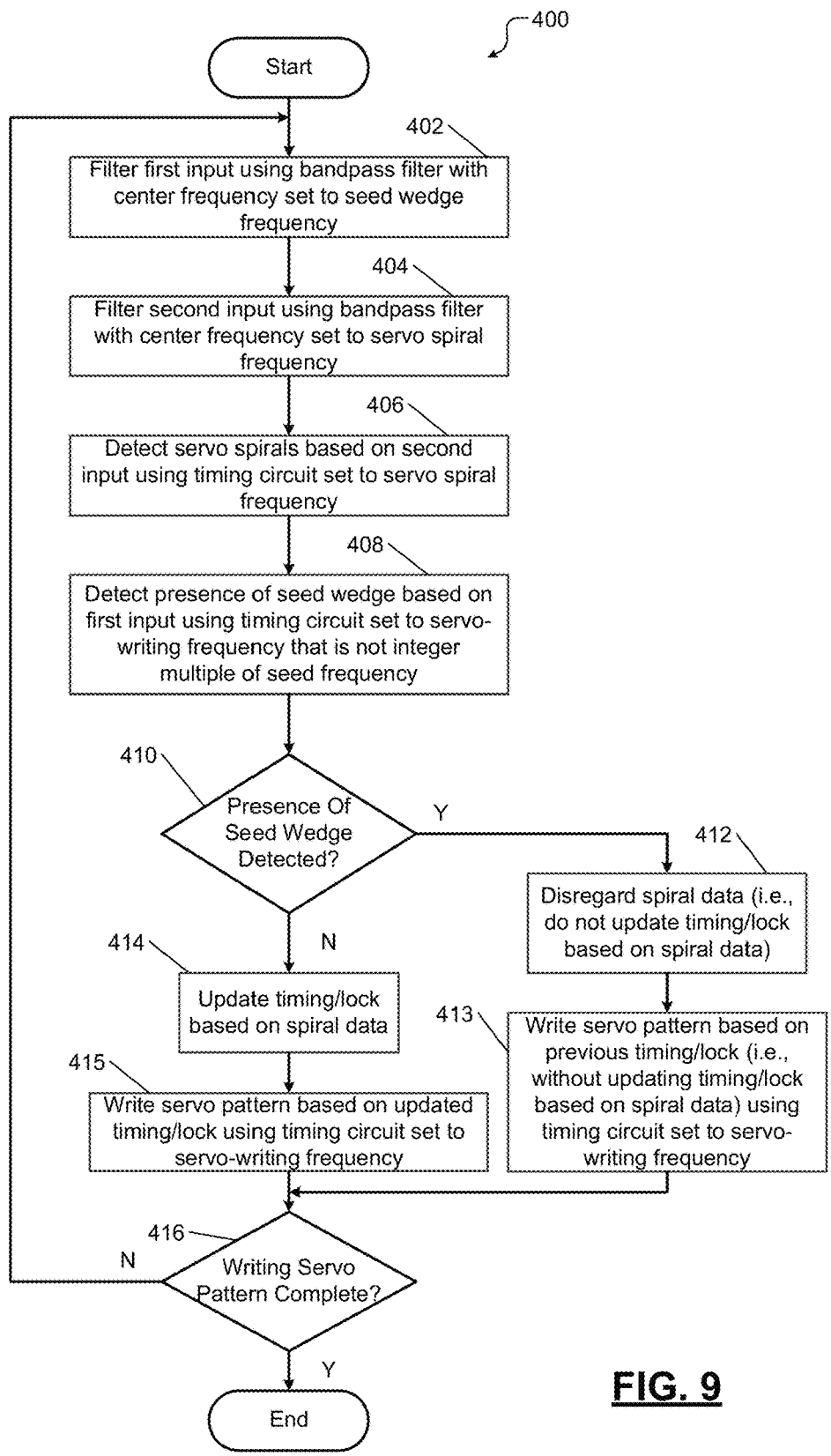
FIG. 9 shows a method for detecting the interference from the seed wedges using one of the channels of the TDMR system used with the SSW system in the HDD.
Figure 10:
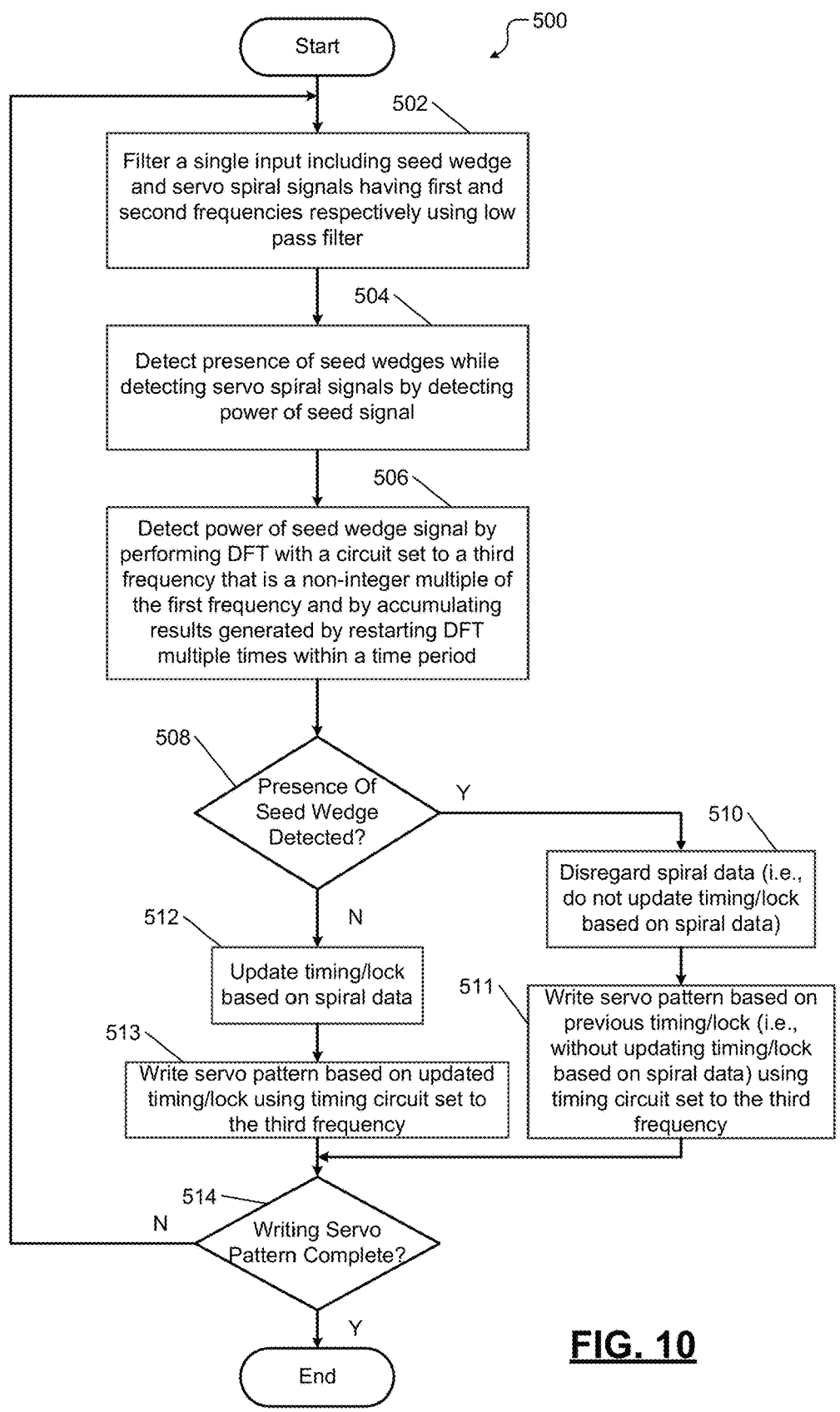
FIG. 10 shows a method for detecting the interference from the seed wedges using the single read/write channel and the SSW system of the HDD.

Below is a description of methods for detecting interference from seed wedges while reading servo spirals and writing a servo pattern based on the servo spirals according to the present disclosure. FIG. 8 shows the overall method. FIG. 9 shows the method when the HDD 10 uses the TDMR system, and the dual channels of the TDMR system are available for reading the servo spirals, detecting the interference, and writing the servo pattern. FIG. 10 shows the method when the HDD 10 does not use the TDMR system, and the single read channel is available for reading the servo spirals, detecting the interference, and writing the servo pattern. Further, for example, the following methods can be executed by the SSW module 28 and/or the HDC module 26, which is generally referred to as the controller in the following description.

FIG. 8 shows a method 300 for detecting interference from seed wedges while reading servo spirals and writing a servo pattern based on the servo spirals, according to one embodiment. For example, the method 300 can be performed by the SSW module 28. At 302, a controller (e.g., the SSW module 28) reads the servo spirals that are written on the magnetic medium of the hard disk. The servo spirals are written on the magnetic medium of the hard disk based on servo wedges written on the magnetic medium before writing the servo spirals on the magnetic medium.

At 304, the controller determines whether interference from the seed wedges is present while reading the servo spirals from the magnetic medium of the hard disk. The controller determines whether interference from the seed wedges is present based on the power of the signals generated by reading the seed wedges while reading the servo spirals.

At 306, if the interference from the seed wedges is present in the read signals, the controller disregards the spiral data (i.e., data from reading the servo spirals) since the spiral data is affected by the interference from the seed wedges present in the read signals and cannot be used to update the timing or lock information. The controller does not use the spiral data to update the timing or lock information. At 307, the controller writes the servo pattern on the magnetic medium based on the previous timing or lock information (i.e., without updating the timing or lock information based on the spiral data). At 308, if the interference from the seed wedges is not present in the read signals, the spiral data is not affected by the interference from the seed wedges, and the controller uses updates the timing or lock information based on the spiral data. At 309, the controller writes the servo pattern on the magnetic disk based on the timing or lock information updated based on the spiral data.

At 310, after 306 or 308, the controller checks whether writing the servo pattern is complete. The controller returns to 302 if writing the servo pattern is incomplete. The controller ends if writing the servo pattern is complete.

FIG. 9 shows a method 400 for detecting interference from seed wedges (e.g., element 82 shown in FIG. 3) using one of the two channels of the TDMR system (e.g., Channel 2 of element 34-1 shown in FIG. 4), according to one embodiment. For example, the method 400 can be performed by the SSW module 28. The same channel (e.g., Channel 2) that is used for detecting the interference is also used for writing a servo pattern based on reading the servo spirals (e.g., element 80 shown in FIG. 3) using the other channel (e.g., Channel 1) of the TDMR system.

At 402, a controller (e.g., the analog filter 116 of the SSW module 28 shown in FIG. 6) filters a first input (e.g., AIN2) received from a first channel of the TDMR system (e.g., Channel 2 shown in FIG. 4) using a first bandpass filter (e.g., the analog filter 116) with a center frequency set to a first frequency (e.g., f1) that is a first frequency of seed wedge signals used to write the seed wedges (e.g., element 82) on the magnetic medium of the hard disk (e.g., the platters 52 of the HDD 10 shown in FIG. 1).

At 404, the controller (e.g., the analog filter 110 of the SSW module 28 shown in FIG. 6) filters a second input (e.g., AIN1) received from a second channel of the TDMR system (e.g., Channel 1 shown in FIG. 4) using a second bandpass filter (e.g., the analog filter 110) with a center frequency set to a second frequency (e.g., f2) that is a frequency of signals used to write the servo spirals (e.g., element 80) on the magnetic medium of the hard disk (e.g., the platters 52 of the HDD 10).

At 406, the controller (e.g., element 104 of the SSW module 28 shown in FIG. 6) detects servo spirals and spiral data based on the second input (e.g., AIN1) using a second timing circuit (e.g., element 104) set to the second frequency f2 (also called the spiral frequency or the servo spiral frequency). At 408, the controller (e.g., element 106 of the SSW module 28 shown in FIG. 6) detects the presence of seed wedges in the read signal while the spirals are read. The controller (e.g., element 106 of the SSW module 28) detects the presence of the seed wedges based on the first input (e.g., AIN2) using a first timing circuit (e.g., element 106) set to a third frequency f3. The third frequency f3 is the servo writing frequency or the frequency of the signals used to write the servo pattern. The third frequency f3 is not an integer multiple of the first frequency f1 (also called the seed frequency or the seed wedge frequency).

The controller (e.g., element 106 of the SSW module 28) detects the presence of the seed wedges by measuring the power of the signals that are generated by reading the seed wedges and that are present in the first input (e.g., AIN2). The controller (e.g., element 106 of the SSW module 28) detects the power of the signals by performing DFT using the first timing circuit (e.g., element 106) that is set to the third frequency f3 for writing the servo pattern, which is not an integer multiple of the first frequency f1 of the seed wedge signals. The controller (e.g., element 106 of the SSW module 28) detects the power by accumulating results generated by restarting DFT multiple times (at every burst gate signal BGATE as explained above) within a predetermined time period (a demodulation window (DEMOD_WIN) within which a spiral signal is to be demodulated).

At 410, the controller (e.g., the SSW module 28) determines whether interference from the seed wedges (e.g., element 82) is present while reading the servo spirals (e.g., element 80) from the magnetic medium (e.g., the platters 52 of the HDD 10) due to the presence of seed wedges (e.g., element 82) detected in the read signal when the servo spirals (e.g., element 80) are read. The controller (e.g., the SSW module 28) determines whether the interference from the seed wedges (e.g., element 82) is present based on the power of the signals generated by reading the seed wedges (e.g., element 82) while reading the servo spirals (e.g., element 80) using DFT as explained above in detail.

At 412, if the interference from the seed wedges (e.g., element 82) is present in the read signals, the controller (e.g., the SSW module 28 and/or the HDC module 26 shown in FIG. 1) disregards the spiral data (i.e., data read from reading the servo spirals) since the spiral data is affected by the interference from the seed wedges (e.g., element 82) present in the read signals and cannot be used to update the timing or lock information. The controller (e.g., the SSW module 28 and/or the HDC module 26) does not use the spiral data to update the timing or lock information. At 413, the controller (e.g., the SSW module 28 and/or the HDC module 26) writes the servo pattern on the magnetic medium (e.g., the platters 52 of the HDD 10) based on the previous timing or lock information (i.e., without updating the timing or lock information based on the spiral data).

At 414, if the interference from the seed wedges (e.g., element 82) is not present in the read signals, the spiral data is not affected by the interference from the seed wedges, and the controller (e.g., the SSW module 28 and/or the HDC module 26) updates the timing or lock information based on the spiral data. At 415, the controller (e.g., the SSW module 28 and/or the HDC module 26) writes the servo pattern on the magnetic medium (e.g., the platters 52 of the HDD 10) based on the timing or lock information updated based on the spiral data using the first timing circuit (e.g., element 106).

At 416, after 412 or 414, the controller (e.g., the SSW module 28 and/or the HDC module 26) checks whether writing the servo pattern is complete. The controller (e.g., the SSW module 28 and/or the HDC module 26) returns to 402 if writing the servo pattern is incomplete. The controller (e.g., the SSW module 28 and/or the HDC module 26) ends if writing the servo pattern is complete.

FIG. 10 shows a method 500 for detecting interference from seed wedges (e.g., element 82 shown in FIG. 3) using a single read channel (e.g., Channel 1 of element 34-2 shown in FIG. 5) that is also used for writing a servo pattern based on reading the servo spirals (e.g., element 80 shown in FIG. 3), according to one embodiment. For example, the method 500 can be performed by the SSW module 28.

At 502, a controller (e.g., the analog filter 110 of the SSW module 28 shown in FIG. 6) filters an input (e.g., AIN1) received from the single read channel (e.g., Channel 1 of element 34-2) using a low pass filter (e.g., the analog filter 110). The input (e.g., AIN1) includes signals generated by reading the seed wedges (e.g., element 82) and servo spirals (e.g., element 80) written on the magnetic medium (e.g., the platters 52 shown in FIG. 1) respectively using signals of first and second frequencies (e.g., f1 and f2). Additionally, the controller (e.g., element 104 of the SSW module 28 shown in FIG. 6) detects servo spirals based on the input (e.g., AIN1) using a spiral detector in a timing circuit (e.g., the spiral detector 120 in element 104 shown in FIG. 6). The controller (e.g., element 104 of the SSW module 28) detects spiral data from the detected servo spirals.

At 504, the controller (e.g., element 104 of the SSW module 28) detects the presence of seed wedges (e.g., element 82) in the read signal (e.g., AIN1) while reading the servo spirals (e.g., element 80). The controller (e.g., element 104 of the SSW module 28) detects the presence of the seed wedges (e.g., element 82) by measuring the power of the signals that are generated by reading the seed wedges (e.g., element 82) and that are present in the input (e.g., AIN1).

At 506, the controller (e.g., element 104 of the SSW module 28) detects the power of the seed wedge signals by performing DFT using the timing circuit (e.g., element 104) that is set to the third frequency f3 for writing the servo pattern. The third frequency f3 for writing the servo pattern is not an integer multiple of the first frequency f1 of the seed wedge signals. The controller (e.g., element 104 of the SSW module 28) detects the power of the seed wedge signals by accumulating results generated by restarting DFT multiple times (at every burst gate signal (BGATE)) within a predetermined time period (a demodulation window (DEMOD_WIN) within which a read spiral signal is to be demodulated).

At 508, the controller (e.g., the SSW module 28) determines whether interference from the seed wedges (e.g., element 82) is present while reading the servo spirals (e.g., element 80) from the magnetic medium (e.g., platters 52 of the HDD 10) due to the presence of seed wedges (e.g., elements 82) detected in the read signal (e.g., AIN1) when the servo spirals (e.g., element 80) are read. The controller (e.g., the SSW module 28) determines whether interference from the seed wedges (e.g., element 82) is present based on the power of the signals generated by reading the seed wedges (e.g., element 82) while reading the servo spirals (e.g., element 80) using DFT as explained above.

At 510, if the interference from the seed wedges (e.g., element 82) is present in the read signals (AIN1), The controller (e.g., the SSW module 28 and/or the HDC module 26 shown in FIG. 1) disregards the spiral data (i.e., data read from reading the servo spirals) since the spiral data is affected by the interference from the seed wedges (e.g., element 82) present in the read signals and cannot be used to update the timing or lock information. The controller (e.g., the SSW module 28 and/or the HDC module 26) does not use the spiral data to update the timing or lock information. At 511, the controller (e.g., the SSW module 28 and/or the HDC module 26) writes the servo pattern on the magnetic medium (e.g., the platters 52 of the HDD 10) based on the previous timing or lock information (i.e., without updating the timing or lock information based on the spiral data) using the timing circuit (e.g., element 104).

At 512, if the interference from the seed wedges (e.g., element 82) is not present in the read signals (e.g., AIN 1), the spiral data is not affected by the interference from the seed wedges, and the controller (e.g., the SSW module 28 and/or the HDC module 26) updates the timing or lock information based on the spiral data. At 513, the controller (e.g., the SSW module 28 and/or the HDC module 26) writes the servo pattern on the magnetic medium (e.g., the platters 52 of the HDD 10) based on the timing or lock information updated based on the spiral data using the timing circuit (e.g., element 104).

At 514, after 510 or 512, the controller (e.g., the SSW module 28 and/or the HDC module 26) checks whether writing the servo pattern is complete. The controller (e.g., the SSW module 28 and/or the HDC module 26) returns to 502 if writing the servo pattern is incomplete. The controller (e.g., the SSW module 28 and/or the HDC module 26) ends if writing the servo pattern is complete.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a controller to
        read servo spirals written on a magnetic surface of a disk drive, wherein the servo spirals are written on the magnetic surface of the disk drive based on seed wedges, and wherein the seed wedges are written on the magnetic surface of the disk drive prior to writing the servo spirals on the magnetic surface of the disk drive; and
        write a servo pattern on the magnetic surface of the disk drive based on reading the servo spirals written on the magnetic surface of the disk drive; and
    a detector to detect, while reading the servo spiral written on the magnetic surface of the disk drive, interference caused by the seed wedges written on the magnetic surface of the disk drive.

2. The system of claim 1, wherein the detector detects the interference by detecting power of signals generated by reading the seed wedges while reading the servo spirals.

3. The system of claim 2, wherein:
    the detector detects the interference when the power of signals generated by reading the seed wedges is greater than or equal to a predetermined threshold; and
    the controller writes the servo pattern based on reading the servo spirals when the power of signals generated by reading the seed wedges is less than the predetermined threshold.

4. The system of claim 1, wherein the seed wedges and the servo spirals are respectively written using signals of first and second frequencies, and wherein the controller includes:
    a first filter to detect a first signal of the first frequency from a first input; and
    a second filter to detect a second signal of the second frequency from a second input,
    wherein the detector detects power of the first signal of the first frequency and detects the interference based on the power of the first signal of the first frequency, and
    wherein the controller determines based on the interference whether to write the servo pattern based on the second signal of the second frequency.

5. The system of claim 4, wherein the first and second filters include band pass filters with center frequencies set to the first and second frequencies, respectively.

6. The system of claim 4, wherein the controller further comprises:
    a first amplifier to amplify the first input to the first filter; and
    a second amplifier to amplify the second input to the second filter,
    wherein the controller adjusts a gain of the first amplifier based on a gain of the second amplifier, and
    wherein the detector detects the power of the first signal of the first frequency based on the adjusted gain of the first amplifier.

7. The system of claim 4, wherein:
    the controller writes the servo pattern using a timing circuit set to a third frequency, where the third frequency is not an integer multiple of the first frequency; and
    the detector detects the power of the first signal of the first frequency by performing a Discrete Fourier Transform on the first signal of the first frequency using the timing circuit set to the third frequency.

8. The system of claim 7 wherein the detector detects the power of the first signal of the first frequency by accumulating results generated by restarting the Discrete Fourier Transform a plurality of times within a predetermined time period.

9. The system of claim 1, wherein the seed wedges, the servo spirals, and the servo pattern are respectively written using signals of first, second, and third frequencies, where the third frequency is not an integer multiple of the first frequency, and wherein the controller comprises:
   a first circuit, including a first filter and a first timing circuit each set to the second frequency, to filter a first input using the first filter and to detect the servo spirals from the first input using the first timing circuit; and
   a second circuit, including a second filter set to the first frequency and a second timing circuit set to the third frequency, to filter a second input using the second filter, detect the seed wedges from the second input using the second timing circuit, and write the servo pattern at the third frequency based on the detected servo spirals using the second timing circuit.

10. The system of claim 9, wherein the detector detects power of signals of the first frequency received from the second filter by performing a Discrete Fourier Transform on the signals of the first frequency using the second timing circuit, and by accumulating results generated by restarting the Discrete Fourier Transform a plurality of times within a predetermined time period.

11. The system of claim 1, wherein the seed wedges and the servo spirals are respectively written using signals of first and second frequencies, where the first frequency is less than the second frequency, and wherein the controller includes:
   a low pass filter to filter an input including signals of the first and second frequencies,
   wherein the detector detects power of a first signal of the first frequency and detects the interference based on the power of the first signal of the first frequency, and
   wherein the controller determines based on the interference whether to write the servo pattern based on a second signal of the second frequency.

12. The system of claim 11, wherein:
   the controller writes the servo pattern based on the second signal of the second frequency using signals of a third frequency, where the third frequency is not an integer multiple of the first frequency; and
   the detector detects the power of the first signal of the first frequency by performing a Discrete Fourier Transform on the first signal of the first frequency, and by accumulating results generated by restarting the Discrete Fourier Transform a plurality of times within a predetermined time period.

13. A method comprising:
   reading servo spirals written on a magnetic surface of a disk drive, wherein the servo spirals are written on the magnetic surface of the disk drive based on seed wedges, and wherein the seed wedges are written on the magnetic surface of the disk drive prior to writing the servo spirals on the magnetic surface of the disk drive;
   writing a servo pattern on the magnetic surface of the disk drive based on reading the servo spirals written on the magnetic surface of the disk drive; and
   detecting, while reading the servo spiral written on the magnetic surface of the disk drive, interference caused by the seed wedges written on the magnetic surface of the disk drive.

14. The method of claim 13, further comprising:
   detecting the interference by detecting power of signals generated by reading the seed wedges while reading the servo spirals;
   detecting the interference when the power of signals generated by reading the seed wedges is greater than or equal to a predetermined threshold; and
   writing the servo pattern based on reading the servo spirals when the power of signals generated by reading the seed wedges is less than the predetermined threshold.

15. The method of claim 13, wherein the seed wedges and the servo spirals are respectively written using signals of first and second frequencies, the method further comprising:
   detecting, using a first filter, a first signal of the first frequency from a first input;
   detecting, using a second filter, a second signal of the second frequency from a second input;
   detecting power of the first signal of the first frequency;
   detecting the interference based on the power of the first signal of the first frequency; and
   determining based on the interference whether to write the servo pattern based on the second signal of the second frequency,
   wherein the first and second filters include band pass filters with center frequencies set to the first and second frequencies, respectively.

16. The method of claim 15, further comprising:
   amplifying, using a first amplifier, the first input to the first filter;
   amplifying, using a second amplifier, the second input to the second filter;
   adjusting a gain of the first amplifier based on a gain of the second amplifier; and
   detecting the power of the first signal of the first frequency based on the adjusted gain of the first amplifier.

17. The method of claim 15, further comprising:
   writing the servo pattern using a timing circuit set to a third frequency, where the third frequency is not an integer multiple of the first frequency;
   detecting the power of the first signal of the first frequency by performing a Discrete Fourier Transform on the first signal of the first frequency using the timing circuit set to the third frequency; and
   detecting the power of the first signal of the first frequency by accumulating results generated by restarting the Discrete Fourier Transform a plurality of times within a predetermined time period.

18. The method of claim 13, wherein the seed wedges, the servo spirals, and the servo pattern are respectively written using signals of first, second, and third frequencies, where the third frequency is not an integer multiple of the first frequency, the method further comprising:
   filtering a first input using a first filter of a first circuit;
   detecting the servo spirals from the first input using a first timing circuit of the first circuit, wherein the first filter and the first timing circuit are set to the second frequency;
   filtering a second input using a second filter of a second circuit, wherein the second filter is set to the first frequency;

detecting the seed wedges from the second input using a second timing circuit of the second circuit, wherein the second timing circuit is set to the third frequency;

writing the servo pattern at the third frequency based on the detected servo spirals using the second timing circuit; and detecting power of signals of the first frequency received from the second filter by performing a Discrete Fourier Transform on the signals of the first frequency using the second timing circuit, and by accumulating results generated by restarting the Discrete Fourier Transform a plurality of times within a predetermined time period.

19. The method of claim 13, wherein the seed wedges and the servo spirals are respectively written using signals of first and second frequencies, where the first frequency is less than the second frequency, the method further comprising:

filtering, using a low pass filter, an input including signals of the first and second frequencies;

detecting power of a first signal of the first frequency;

detecting the interference based on the power of the first signal of the first frequency; and determining based on the interference whether to write the servo pattern based on a second signal of the second frequency.

20. The method of claim 19, further comprising:

writing the servo pattern based on the second signal of the second frequency using signals of a third frequency, where the third frequency is not an integer multiple of the first frequency; and detecting the power of the first signal of the first frequency by performing a Discrete Fourier Transform on the first signal of the first frequency, and by accumulating results generated by restarting the Discrete Fourier Transform a plurality of times within a predetermined time period.

* * * * *